(12) United States Patent
Davis

(10) Patent No.: US 9,230,036 B2
(45) Date of Patent: Jan. 5, 2016

(54) ENHANCED BROWSER COOKIE MANAGEMENT

(75) Inventor: Douglas B. Davis, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 12/794,681

(22) Filed: Jun. 4, 2010

(65) Prior Publication Data

US 2011/0302288 A1 Dec. 8, 2011

(51) Int. Cl.
*G06F 15/173* (2006.01)
*G06F 17/30* (2006.01)

(52) U.S. Cl.
CPC .................. *G06F 17/30899* (2013.01)

(58) Field of Classification Search
USPC ....................................... 709/223
See application file for complete search history.

(56) References Cited

U.S. PATENT DOCUMENTS

| | | | |
|---|---|---|---|
| 6,851,060 B1 * | 2/2005 | Shrader | 726/10 |
| 7,359,958 B2 | 4/2008 | Sears, Jr. et al. | |
| 8,166,406 B1 * | 4/2012 | Goldfeder et al. | 715/745 |
| 2002/0156781 A1 * | 10/2002 | Cordray et al. | 707/9 |
| 2005/0216845 A1 | 9/2005 | Wiener | |
| 2006/0075122 A1 | 4/2006 | Lindskog et al. | |

FOREIGN PATENT DOCUMENTS

JP 2005339454 A2 12/2005

* cited by examiner

*Primary Examiner* — Andrew Georgandellis
(74) *Attorney, Agent, or Firm* — Jordan IP Law, LLC

(57) ABSTRACT

Systems and methods of managing cookie handling settings provide for retrieving a web page based on a browser request and detecting one or more cookie requests associated with the web page being viewed rather than the web page associated with the cookie. A real-time dialog containing data corresponding to each cookie request associated with the web page being viewed may be generated while the web page is displayed.

17 Claims, 3 Drawing Sheets

22

| Viewed Page | Source Site | Cookie | Value | Setting |
|---|---|---|---|---|
| http://espn.go.com/ | go.com | SWID | MD839Nd | allow |
| http://espn.go.com/ | espn.go.com | userAB | 2132JCM | allow |
| http://espn.go.com/ | imrworldwide.com | xyz | DJD9i9k | deny |
| http://espn.go.com/nfl/ | atdmt.com | AA002 | kdkf9848 | deny |
| http://www.cnn.com/ | www.cnn.com | CG | KJDIIDd | allow |

22

| Viewed Page | Source Site | Cookie | Value | Setting |
|---|---|---|---|---|
| http://espn.go.com/ | go.com | SWID | MD839Nd | allow |
| http://espn.go.com/ | espn.go.com | userAB | 2132JCM | allow |
| http://espn.go.com/ | imrworldwide.com | xyz | DJD9i9k | deny |
| http://espn.go.com/nfl/ | atdmt.com | AA002 | kdkf9848 | deny |
| http://www.cnn.com/ | www.cnn.com | CG | KJDIIDd | allow |

ENHANCED BROWSER COOKIE MANAGEMENT

BACKGROUND

1. Technical Field

Embodiments of the present invention generally relate to browser cookies. More particularly, embodiments relate to the enhanced management of browser cookies.

2. Discussion

The use of browser cookies to facilitate advertising, web page functionality and statistical analysis has continued to grow on the part of web site operators and developers. End users, on the other hand, may have privacy concerns with regard to the setting of cookies on their machines. These concerns are often balanced, however, against the ability to have a fully functional web browsing experience, which can often require the setting and usage of cookies. Accordingly, depending on the browser and platform configuration, the user might have the option of automatically or manually deciding whether to allow or deny the setting of cookies.

Although conventional cookie handling techniques may be acceptable in certain circumstances, there still remains considerable room for improvement. For example, the automated process of handling cookies may not give the user a sufficient level granularity as to the type of cookies to allow or deny. In addition, the manual process is typically done on a per-cookie basis, which can make it difficult for the user to gain a relative perspective of which cookies to allow or deny. Accordingly, it might not be uncommon for a user to allow a cookie that should have been denied or deny a cookie that should have been allowed. While some browsers might permit the user to view and/or change the cookie handling decisions that have been made offline via cookie hosts lists, these lists may not enable the user to effectively identify the web pages associated with the cookies in question.

BRIEF SUMMARY

Embodiments may provide for a method in which a web page is retrieved based on a browser request. One or more cookie requests associated with the web page may be detected. The method can also provide for generating a real-time dialog containing data corresponding to each cookie request associated with the web page while the web page is displayed in the browser.

Embodiments can also include a computer program product having a computer readable storage medium and computer usable code stored on the computer readable storage medium. If executed by a processor, the computer usable code may cause a computer to retrieve a web page based on a browser request and detect one or more cookie requests associated with the web page. The computer usable code can also cause a computer to generate a real-time dialog containing data corresponding to each cookie request associated with the web page while the web page is displayed.

Other embodiments may provide for a method in which a browser request is received, wherein the browser request corresponds to at least one of a link selection, a back button selection, a forward button selection, and a uniform resource locator (URL) entry. The web page can be retrieved from at least one of a cache location and a web server, and one or more cookie requests associated with the web page may be detected. The method can further provide for generating a real-time dialog containing data corresponding to each cookie request associated with the web page while the web page is displayed. The data in the real-time dialog may include a viewed page address and at least one of a source site identifier, a cookie value and a cookie handling setting for each cookie request associated with the web page. In addition, a cookie handling input may be received via the real-time dialog, wherein the method can provide for modifying at least one of the cooking handling settings based on the cookie handling input.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figures 1, 2:
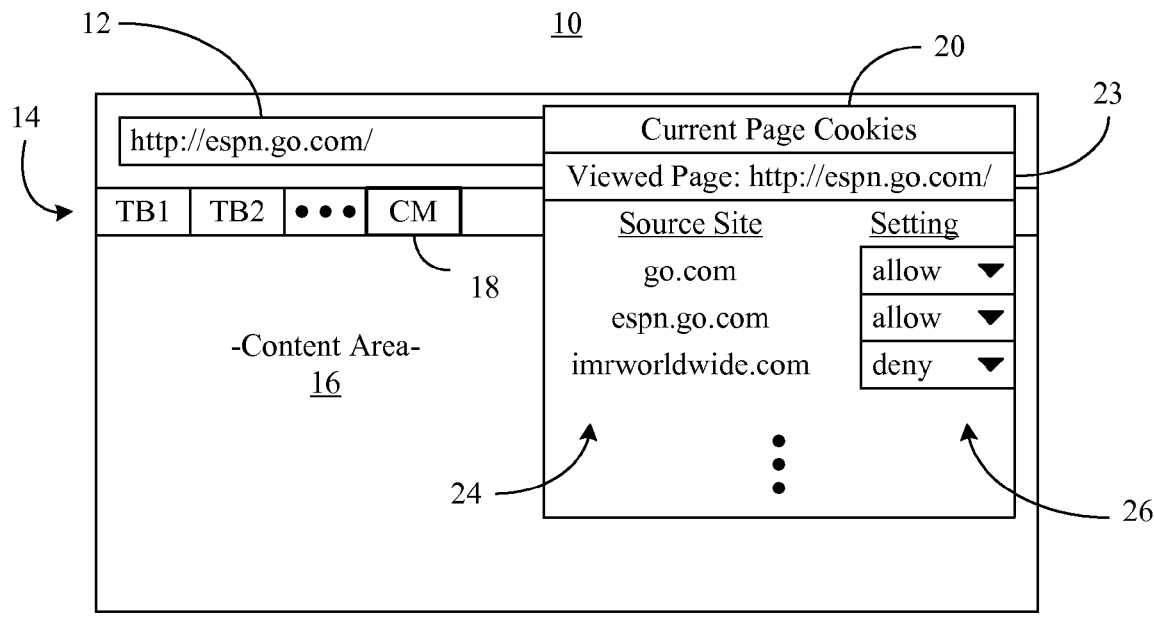
FIG. 1 is a block diagram of an example of a real-time dialog according to an embodiment.
FIG. 2 is a block diagram of an example of an offline dialog according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a web browser interface 10 is shown. In the illustrated example, the browser interface 10 includes an address bar 12, a toolbar 14 and a content area of a web page 16. A user may therefore interact with the browser interface 10 to view various web pages that may be formatted in HTML (Hypertext Markup Language), XHTML (Extensible HTML), etc., wherein web pages can be requested and served from web servers using HTTP (Hypertext Transfer Protocol) or other suitable protocol. Each web page 16 may be associated with one or more requests to set a cookie, wherein a set cookie can be a text string stored in the memory of the user's machine (e.g., computer). For example, an HTTP response to a web page request might include a request such as "Set-Cookie: name=value" for each cookie that a server is attempting to set, wherein the "name=value" pair is stored to local memory and used for subsequent responses to the associated web server if the cookie request is accepted. Cookies might also be set by JavaScript or similar scripts running within the browser. In JavaScript, the object "document.cookie" can be used for this purpose. In any event, one or more cookie requests associated with the web page 16 may be detected by the browser. Including the cookie in data packets sent by the user's machine may enable web servers to collect and use information about the user's browsing activities, login data, shopping cart contents, preferences, personal information, and so on.

The illustrated toolbar 14 includes various toolbar icons ("TB1", "TB2"), wherein one of the icons can be a cookie management ("CM") icon 18. If the user selects the cookie management icon 18, a real-time dialog 20 may be generated, wherein the illustrated real-time dialog 20 contains data corresponding to each cookie request associated with the web page 16 while the web page 16 is displayed in the browser. In particular, the data in the real-time dialog 20 might include, but is not limited to, a viewed page address 23, a source site identifier 24 and a cookie handling setting 26 for each cookie request associated with the web page 16. The data in the real-time dialog 20 might also include other information such as the value of each cookie.

In the illustrated example, when the user visits the main web page 16 at espn.go.com (e.g., index.html), attempts are made by three different sites (i.e., "go.com", "espn.go.com" and "imrworldwide.com") to set a cookie on the user's machine. The real-time dialog 20 can therefore enable the user to decide whether to allow each detected cookie request while the user is viewing the web page 16 and while the user is viewing all cookies associated with the web page 16. Simply put, each of the cookie handling settings 26 can be modified based on the cookie handling input obtained from the user via the real-time dialog 20 in context with the other cookies associated with the page. As will be discussed in greater detail, the cookie handling settings 26 may be associated with the web page 16 and stored in the browser cache so that if the user returns to the page (e.g., by selecting the "back button" of the browser), the settings 26 can be retrieved and modified as desired by the user.

Moreover, although the address bar 12 alone could give the user the impression that only the viewed web page 16 ("http://espn.go.com/index.html" in the example shown) is being accessed, the real-time dialog 20 can inform the user that other sites 24 (i.e., "go.com", "espn.go.com" and "imrworldwide.com") may also be communicating with the user's browser.

FIG. 2 shows an offline dialog 22 containing data corresponding to each cookie request encountered by the user. The user may therefore interact with the offline dialog 22 to view and modify cookie handling settings outside of the browsing session. In the illustrated example, the data in the offline dialog 22 includes, but is not limited to, a viewed page address 28, a source site identifier 30, a cookie name 32, a cookie value 33 and a cookie handling setting 34 for each cookie request. The data might be sorted on any of the illustrated columns. In addition, the cookie handling settings 34 may be modified based on cookie handling input received via the offline dialog 22. By associating each cookie with the web page on which it was encountered, the illustrated approach provides the user with a greater ability to evaluate the usefulness and desirability of individual cookies.

Figure 3:
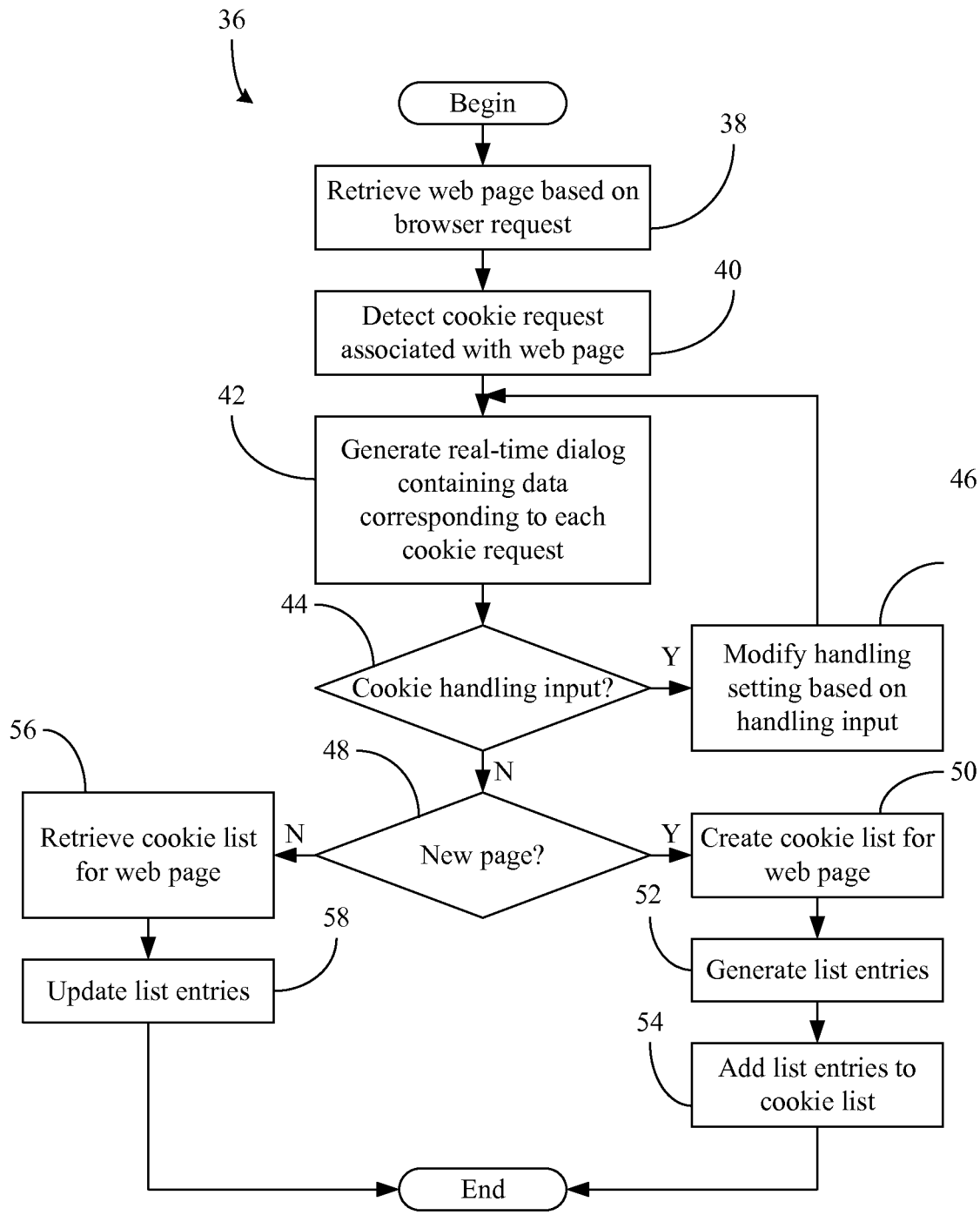
FIG. 3 is a flowchart of an example of a method of managing cooking handling settings according to an embodiment.

Turning now to FIG. 3, a method 36 of managing browser cookies is shown. The method 36 could be implemented in executable software as a set of logic instructions stored in a machine- or computer-readable storage medium of a memory such as random access memory (RAM), read only memory (ROM), programmable ROM (PROM), flash memory, etc., as fixed-functionality hardware using circuit technology such as ASIC, complementary metal oxide semiconductor (CMOS) or transistor-transistor logic (TTL) technology, or any combination thereof. In one example, the method 36 is implemented as a browser plug-in.

Processing block 38 provides for retrieving a web page based on a web browser request. The web browser request might correspond to a link selection, a back button selection, a forward button selection, a uniform resource locator (URL) entry, and so on, wherein the web page could be retrieved from a web server, a local cache location, or any combination thereof. One or more cookie requests associated with the web page can be detected at block 40. As already noted, the source of cookie requests could be a server such as a host or third party server, or a script running on the page in question. Illustrated block 42 provides for generating a real-time dialog containing data corresponding to each cookie request associated with the web page while the web page is displayed. Block 42 might be conducted in response to the selection of a cookie management toolbar option or another suitable event. In addition, the generation of the real-time dialog might involve the retrieval of a cached cookie list containing one or more cookie request entries. As already noted, the data in the real-time dialog could include a source site identifier and a cookie handling setting for each cookie request associated with the web page.

If it is determined at block 44 that cookie handling input has been received, illustrated block 46 provides for modifying at least one of the cookie handling settings based on the cookie handling input, and updating of the real-time dialog accordingly. Block 48 provides for determining whether the web page is newly visited. The determination at block 48 might be conducted by comparing the current web page to the browser history. If the page is not found in the browser history, it may be treated as new, wherein block 50 provides for creating a cookie list for the new web page. For each cookie request associated with the web page, illustrated block 52 provides for generating a list entry including data such as the cookie name, the cookie value, the source site identifier, the cookie handling setting, and the viewed page address. The list entries may be added to the cookie list associated with the displayed web page at block 54.

If the current web page has been visited before, block 56 provides for retrieving a cached cookie list for the web page, wherein the list can be updated with the entries for any newly encountered cookie requests at block 58. Thus, the method 36 enables cookies and their handling settings to be dynamically managed and updated on a per-page basis.

Figure 4:
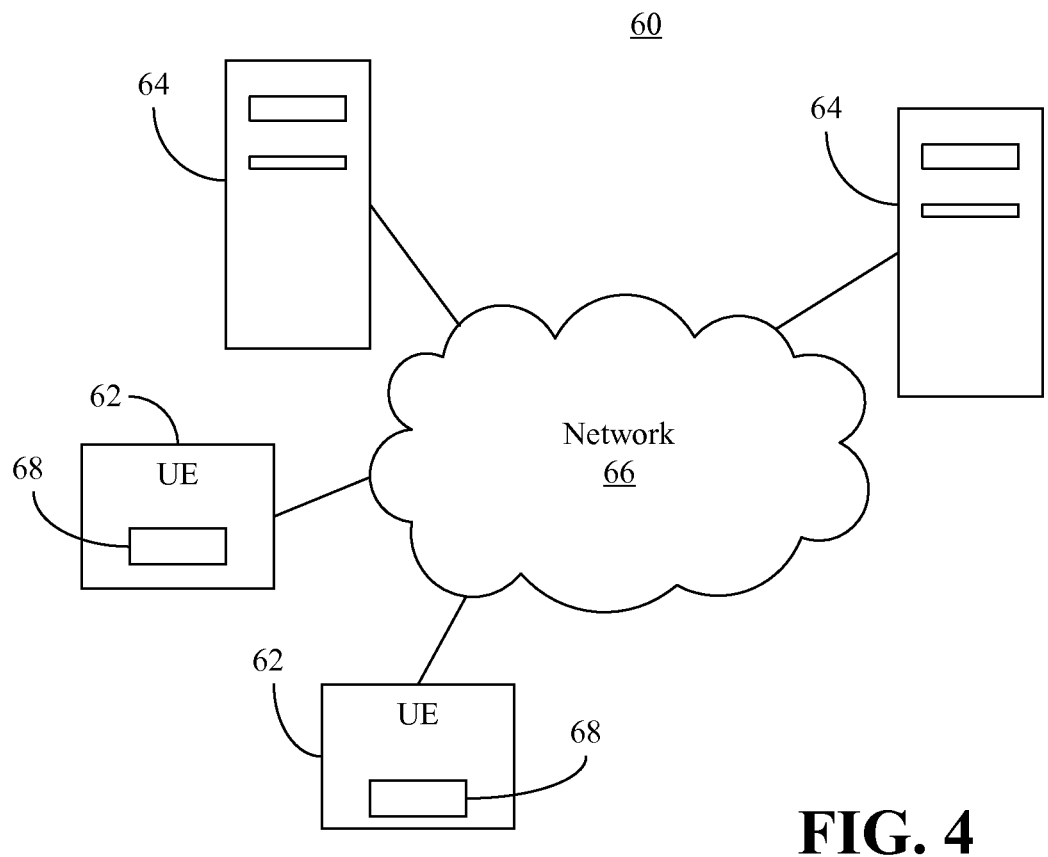
FIG. 4 is a block diagram of an example of a network architecture according to an embodiment.

FIG. 4 shows a networking architecture 60 in which real-time and offline cookie management dialogs may be presented to individuals operating user equipment (UE) 62, servers 64, and/or other computing platforms. In the illustrated example, the UE 62, which can include web browsing capability, may be a personal computer (PC), notebook computer, personal digital assistant (PDA), wireless smartphone, or other device having access to the servers 64, via a network 66. The UE 62 connections to the network 66 may include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances. The UE 62 devices could be located in the same physical location or in different locations.

In addition, the network 66 can include any suitable combination of servers, access points, routers, base stations, mobile switching centers, public switching telephone network (PSTN) components, etc., to facilitate communication between the UE 62 and the servers 64. The servers 64, which might support a wide variety of database management, advertising, statistical analysis, e-commerce transactions and other activities, may include distributed and/or redundant web-based servers that are able to respond to web page requests for content. Thus, the servers 64 can have stored thereon hypertext markup language (HTML) and other markup language-encoded content, as well as databases and applications such as Java and other applications. In addition, the servers 64 might be able to generate cookie requests in response to web-based requests from the UE 62, wherein subsequent replies from the UE 62 could contain the cookies set by the servers 64 in order to enhance browsing functionality and/or data collection and analysis activities by the servers 64. The servers 64 could also be part of a cloud computing environment in which resources are shared across platforms in a complex fashion.

In the illustrated example, the UE 62 includes cookie management logic 68 capable of facilitating cookie handling settings on a per-page basis. In particular, the logic 68 can be configured to retrieve a web page based on a browser request, detect one or more cookie requests associated with the web page, and generate a real-time dialog containing data corresponding to each cookie request associated with the web page while the web page is displayed in a browser, as already discussed. The cookie management logic 68 might also be configured to generate an offline dialog containing data corresponding to each cookie request, wherein the data in the offline dialog could include a source site identifier, a cookie handling setting and a viewed page address, as already discussed.

Figure 5:
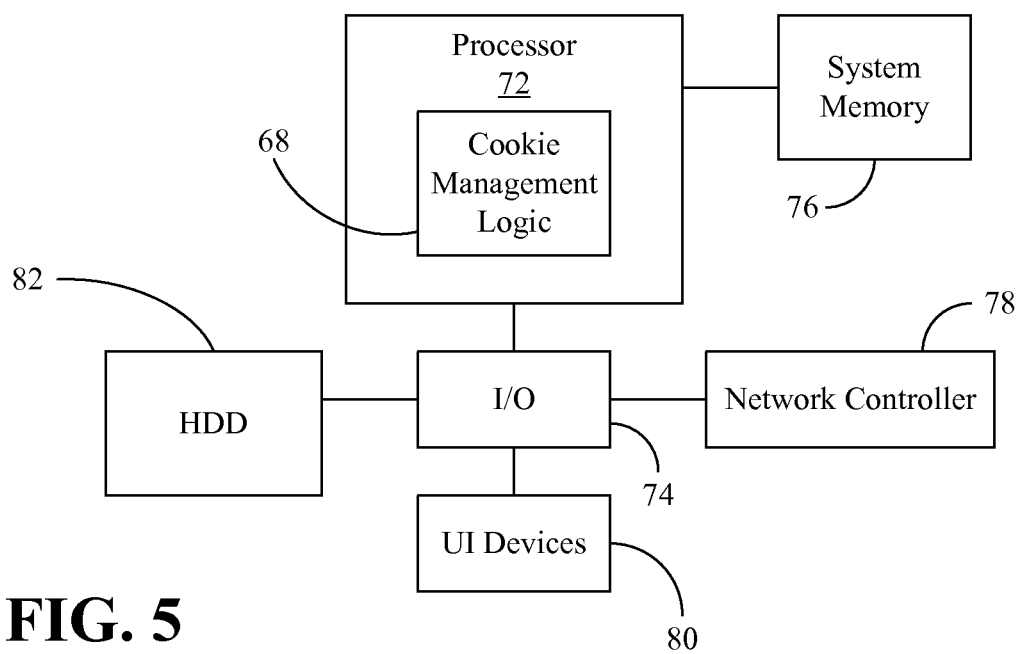
FIG. 5 is a block diagram of an example of a computing system according to an embodiment.

Turning now to FIG. 5, a platform 70 is shown. The illustrated platform 70 may be part of a computing system, wireless communication device, media player, imaging device, etc., or any combination thereof. In particular, the platform 70 may include a processor 72 coupled to an input/output (I/O) interface/device 74 and system memory 76, a network controller 78, user interface (UI) devices 80 (e.g., browser, display, touch screen, keypad, mouse, etc. in order to allow a user to interact with and perceive information from the platform), and a computer readable storage medium such as a hard disk drive (HDD) 82, solid state disk (SSD), etc. The system memory 76 may be configured as dynamic random access memory (DRAM) modules that could be incorporated into a single inline memory module (SIMM), dual inline memory module (DIMM), small outline DIMM (SODIMM), and so on.

In one example, the processor 72 executes cookie management logic 68 retrieved from the system memory 76, internal or external caches, or other computer readable storage media such as HDD 82. The cookie management logic 68 may include functionality to manage cookie handling settings on a per-page basis, already discussed. The network controller 78 connection to the data sources might include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method comprising:
   receiving a browser request, wherein the browser request corresponds to at least one of a link selection, a back button selection, a forward button selection, and a uniform resource locator entry;
   retrieving the web page from at least one of a cache location and a web server;
   detecting one or more cookie requests associated with the web page; the one or more cookie requests associated with a cookie attempted to be stored in a memory;
   generating a dialog containing a plurality of entries, each entry corresponding to one of the cookie requests associated with the web page while the web page is displayed and prior to a respective cookie being stored, wherein at least two entries each include both a first field that contains a viewed page address utilized to view the web page displayed and a second field that contains a source site address corresponding to a true source site of the respective cookie attempted to be stored while the web page is displayed, and wherein the at least two entries each further include at least one of a cookie value and a cookie handling setting for the corresponding cookie request associated with the web page;
   receiving a cookie handling input via the dialog, wherein the cookie handling input is associated with an action to be performed to process the one or more cookie request; and
   modifying at least one of the cookie handling settings based on the cookie handling input.

2. The method of claim 1, further including:
   generating, for each cookie request, a list entry including both a first field that contains a viewed page address and a second field that contains a source site address, and wherein the list entry further includes at least one of a cookie name, a cookie value, and a cookie handling setting;
   adding the list entry to a list associated with the web page; and
   storing the list to the cache location.

3. The method of claim 1, wherein the dialog includes one or more of a real-time dialog and an offline dialog.

4. The method of claim 1, wherein at least one source site address is a different address than a corresponding viewed page address.

5. A computer program product comprising:
   a non-transitory computer readable storage medium; and
   computer usable code stored on the computer readable storage medium, where, if executed by a processor, the computer usable code causes a computer to:
   retrieve a web page based on a browser request;
   detect one or more cookie requests associated with the web page, the one or more cookie requests associated with a cookie attempted to be stored in a memory; and
   generate a dialog containing a plurality of entries, each entry corresponding to one of the cookie requests associated with the web page while the web page is displayed and prior to a respective cookie being stored, wherein at least two entries each include both a first field that contains a viewed page address utilized to view the web page displayed and a second field that contains a source site address corresponding to a true source site of the respective cookie attempted to be stored while the web page is displayed, and wherein the real-time dialog enables a user to provide a cookie handling input associated with an action to be performed to process the one or more cookie requests.

6. The computer program product of claim 5, wherein, if executed, the computer usable code further causes a computer to:
   receive the cookie handling input via the dialog; and
   modify a cookie handling setting based on the cookie handling input.

7. The computer program product of claim 5, wherein, if executed, the computer usable further causes a computer to:
   generate, for each cookie request, a list entry including both a first field that contains a viewed page address and a second field that contains a source site address, and wherein the list entry further includes at least one of a cookie name, a cookie value, and a cookie handling setting;
   add the list entry to a list associated with the web page; and
   store the list to a cache location.

8. The computer program product of claim 5, wherein the dialog is to include one or more of a real-time dialog and an offline dialog.

9. The computer program product of claim 5, wherein the page is to be retrieved from at least one of a cache location and a web server.

10. The computer program product of claim 5, wherein, if executed, the computer usable code further causes a computer to receive the browser request, wherein the browser request is to correspond to at least one of a link selection, a back button selection, a forward button selection, and a uniform resource locator entry.

11. The computer program product of claim 5, wherein, if executed, the computer usable further causes a computer to generate, for each cookie request, a list entry including both a first field that contains a viewed page address and a second field that contains a source site address, and wherein the list entry further includes a cookie handling setting for the corresponding cookie request associated with the web page.

12. A computer-implemented method comprising:
retrieving a web page based on a browser request;
detecting one or more cookie requests associated with the web page, the one or more cookie requests associated with a cookie attempted to be stored in a memory; and
generating a dialog containing a plurality of entries, each entry corresponding to one of the cookie requests associated with the web page while the web page is displayed and prior to a respective cookie being stored, wherein at least two entries each include both a first field that contains a viewed page address utilized to view the web page displayed and a second field that contains a source site address corresponding to a true source site of the respective cookie attempted to be stored while the web page is displayed, and wherein the real-time dialog enables a user to provide a cookie handling input associated with an action to be performed to process the one or more cookie requests.

13. The method of claim 12, further including:
receiving the cookie handling input via the dialog; and
modifying at least one of the cookie handling settings based on the cookie handling input.

14. The method of claim 12, further including:
generating, for each cookie request, a list entry including both a first field that contains a viewed page address and a second field that contains a source site address, and wherein the list entry further includes at least one of a cookie name, a cookie value, and a cookie handling setting;
adding the list entry to a list associated with the web page; and
storing the list to a cache location.

15. The method of claim 12, wherein the dialog includes one or more of a real-time dialog and an offline dialog.

16. The method of claim 12, wherein the web page is retrieved from at least one of a cache location and a web server.

17. The method of claim 12, further including receiving the browser request, wherein the browser request corresponds to at least one of a link selection, a back button selection, a forward button selection, and a uniform resource locator entry.

* * * * *